US012651742B2

(12) United States Patent
Kim et al.

(10) Patent No.: US 12,651,742 B2
(45) Date of Patent: *Jun. 9, 2026

(54) POSITIVE ELECTRODE ACTIVE MATERIAL, POSITIVE ELECTRODE INCLUDING THE POSITIVE ELECTRODE ACTIVE MATERIAL, AND SECONDARY BATTERY INCLUDING THE POSITIVE ELECTRODE

(71) Applicant: LG Energy Solution, Ltd., Seoul (KR)

(72) Inventors: Tae Gon Kim, Daejeon (KR); Min Kwak, Daejeon (KR); Jeong Gil Kim, Daejeon (KR); Myeong Soo Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 606 days.

This patent is subject to a terminal disclaimer.

(21) Appl. No.: 18/021,458

(22) PCT Filed: Aug. 31, 2021

(86) PCT No.: PCT/KR2021/011697
§ 371 (c)(1),
(2) Date: Feb. 15, 2023

(87) PCT Pub. No.: WO2022/050664
PCT Pub. Date: Mar. 10, 2022

(65) Prior Publication Data
US 2023/0343936 A1      Oct. 26, 2023

(30) Foreign Application Priority Data

Sep. 1, 2020    (KR) ........................ 10-2020-0111333

(51) Int. Cl.
H01M 4/36          (2006.01)
H01M 4/485          (2010.01)
(Continued)

(52) U.S. Cl.
CPC ........... H01M 4/366 (2013.01); H01M 4/485 (2013.01); H01M 4/505 (2013.01); H01M 4/525 (2013.01);
(Continued)

(58) Field of Classification Search
CPC ...... H01M 4/366; H01M 4/485; H01M 4/505; H01M 4/525; H01M 4/583
See application file for complete search history.

(56) References Cited

U.S. PATENT DOCUMENTS 11,894,558 B2 *   2/2024   Kim ..................... C01B 32/184
2011/0068293 A1    3/2011   Fujino et al.
(Continued)

FOREIGN PATENT DOCUMENTS

JP        2005015910 A    1/2005
JP        2010027604 A    2/2010
(Continued)

OTHER PUBLICATIONS

International Search Report for Application No. PCT/KR2021/011697 mailed Dec. 13, 2021, pp. 1-.3.
(Continued)

*Primary Examiner* — Barbara L Gilliam
(74) *Attorney, Agent, or Firm* — Lerner David LLP

(57) ABSTRACT

Provided is a positive electrode active material including a core and a coating layer disposed on the core, wherein the core includes $Li_{1+x}M_yO_{2+z}$, wherein M is at least one element selected from the group consisting of nickel (Ni), cobalt (Co), manganese (Mn), iron (Fe), phosphorus (P), aluminum (Al), magnesium (Mg), calcium (Ca), zirconium (Zr), zinc (Zn), titanium (Ti), ruthenium (Ru), niobium (Nb), tungsten (W), boron (B), silicon (Si), sodium (Na), potassium (K), molybdenum (Mo), and vanadium (V), wherein $-0.2 \leq x \leq 0.2$, $0 < y \leq 2$, and $0 \leq z \leq 2$, wherein the coating layer
(Continued)

Graphene Sheet

SURFACE
OXIDATION

Carbon Black

STRUCTURE
RUPTURE includes carbon-based particles, wherein the carbon-based particles includes a structure in which a plurality of graphene sheets are connected to each other, and wherein a D/G peak ratio of the positive electrode active material is in a range of 0.9 to 1.3 during Raman spectrum measurement.

11 Claims, 5 Drawing Sheets

(51) Int. Cl.
| | | |
|---|---|---|
| *H01M 4/505* | (2010.01) | |
| *H01M 4/525* | (2010.01) | |
| *H01M 4/583* | (2010.01) | |
| *H01M 4/02* | (2006.01) | |

(52) U.S. Cl.
CPC ...... *H01M 4/583* (2013.01); *H01M 2004/021* (2013.01); *H01M 2004/028* (2013.01)

(56) References Cited

U.S. PATENT DOCUMENTS

| | | | |
|---|---|---|---|
| 2012/0088151 A1 | 4/2012 | Yamazaki et al. | |
| 2014/0315089 A1 | 10/2014 | Yu et al. | |
| 2015/0123050 A1 | 5/2015 | Yamazaki et al. | |
| 2016/0156026 A1 | 6/2016 | Kitagawa et al. | |
| 2016/0164091 A1* | 6/2016 | Matsuda | H01M 4/525 252/182.1 |
| 2016/0204424 A1 | 7/2016 | Sawai et al. | |
| 2016/0285102 A1* | 9/2016 | Shitaba | H01M 4/136 |
| 2020/0335794 A1* | 10/2020 | Kim | H01M 10/0525 |
| 2021/0013511 A1 | 1/2021 | Kim et al. | |

FOREIGN PATENT DOCUMENTS

| | | | | | |
|---|---|---|---|---|---|
| JP | 2013062089 A | 4/2013 | | | |
| JP | 2013211209 A | 10/2013 | | | |
| JP | 2016018588 A | 2/2016 | | | |
| JP | 2016103352 A | 6/2016 | | | |
| JP | 2016122670 A | 7/2016 | | | |
| JP | 2016189321 A | 11/2016 | | | |
| JP | 2019036455 A | 3/2019 | | | |
| KR | 20140126585 A | 10/2014 | | | |
| KR | 20160044513 A | 4/2016 | | | |
| KR | 101937900 B1 | 1/2019 | | | |
| KR | 20190117279 A | 10/2019 | | | |
| KR | 20200031304 A | 3/2020 | | | |
| WO | 2015005439 A1 | 1/2015 | | | |
| WO | WO-2019156462 A1 * | 8/2019 | .......... | C01B 32/184 |
| WO | 2019194613 A1 | 10/2019 | | | |

OTHER PUBLICATIONS

Ndama, A. T. et al "Measurement of Electrical Resistivity of Powder; Comparison of Three Methods", International Journal of Engineering Trends and Technology, Aug. 2021. pp. 41-48, vol. 69, Issue 8.

Extended European Search Report including Written Opinion for Application No. 21864624.8 dated Aug. 6, 2024, pp. 1-9.

Search Report dated Nov. 21, 2024 from the Office Action for Chinese Application No. 202180051373.X issued Nov. 23, 2024, 2 pages.

* cited by examiner

POSITIVE ELECTRODE ACTIVE MATERIAL, POSITIVE ELECTRODE INCLUDING THE POSITIVE ELECTRODE ACTIVE MATERIAL, AND SECONDARY BATTERY INCLUDING THE POSITIVE ELECTRODE

CROSS-REFERENCE TO RELATED APPLICATIONS

This application is a national phase entry of PCT/KR2021/011697, filed on Aug. 31, 2021, which claims priority from Korean Patent Application No. 10-2020-0111333, filed on Sep. 1, 2020, the disclosures of which are incorporated by reference herein.

TECHNICAL FIELD

The present invention relates to a positive electrode active material including a core and a coating layer disposed on the core, wherein the core includes $Li_{1+x}M_yO_{2+z}$, wherein M is at least one element selected from the group consisting of nickel (Ni), cobalt (Co), manganese (Mn), iron (Fe), phosphorus (P), aluminum (Al), magnesium (Mg), calcium (Ca), zirconium (Zr), zinc (Zn), titanium (Ti), ruthenium (Ru), niobium (Nb), tungsten (W), boron (B), silicon (Si), sodium (Na), potassium (K), molybdenum (Mo), and vanadium (V), wherein $-0.2 \leq x \leq 0.2$, $0 < y \leq 2$, and $0 \leq z \leq 2$, wherein the coating layer includes carbon-based particles, wherein the carbon-based particles include a structure in which a plurality of graphene sheets are connected to each other, and wherein a D/G peak ratio of the positive electrode active material is in a range of 0.9 to 1.3 during Raman spectrum measurement, a positive electrode including the positive electrode active material, and a secondary battery including the positive electrode.

BACKGROUND

Demand for batteries as an energy source has significantly increased as technology development and demand with respect to mobile devices have recently increased, and a variety of research on batteries capable of meeting various needs has been carried out accordingly. Particularly, as a power source for such devices, research into lithium secondary batteries having excellent lifetime and cycle characteristics as well as high energy density has been actively conducted.

A lithium secondary battery denotes a battery in which a non-aqueous electrolyte containing lithium ions is included in an electrode assembly which includes a positive electrode including a positive electrode active material capable of intercalating/deintercalating the lithium ions, a negative electrode including a negative electrode active material capable of intercalating/deintercalating the lithium ions, and a microporous separator disposed between the positive electrode and the negative electrode.

A lithium transition metal oxide may be used as the positive electrode active material, and cobalt, nickel, or manganese may be used as the transition metal. Among them, in order to replace the use of expensive cobalt, a lithium transition metal oxide having a high content of inexpensive nickel or manganese has tended to be mainly used. Particularly, the lithium transition metal oxide having a high nickel content is advantageous in that energy density is high and price is not high.

However, with respect to the lithium transition metal oxide having a high nickel content, electrical conductivity is lower than that of a lithium transition metal oxide having a high cobalt content. Also, due to a layered structure of nickel, an amount of lithium must also be increased when the nickel content is high. Accordingly, there is a problem in that a lithium component remaining on a surface of the positive electrode active material increases, the positive electrode active material easily reacts with moisture, and a structure of the surface of the positive electrode active material is collapsed in the air. In addition, since the lithium remaining on the surface easily reacts with carbon dioxide in the air to change into a form of lithium carbonate, there is a problem in that surface resistance of the positive electrode active material is significantly increased. Furthermore, in a case in which lithium remains in a form of LiOH, since a binder and OH⁻ of the LiOH react to cause gelation of a positive electrode slurry, processability in the preparation of the positive electrode may be significantly reduced.

In order to solve these problems, a method of forming a carbon coating layer on the surface of the lithium transition metal oxide having a high nickel content using a polymer or pitch is being actively considered. However, with respect to the above-described method, a high-temperature heat treatment process for carbonization is absolutely necessary, and, in this case, since carbon atoms and oxygen atoms on the surface of the lithium transition metal oxide having a high nickel content react with each other, an oxidation number of metal in the lithium transition metal oxide having a high nickel content changes significantly. Accordingly, the transition metal may be dissolved during battery operation, and the collapse of the surface structure of the lithium transition metal oxide is accelerated to significantly degrade input/output characteristics and life characteristics of the battery.

Thus, there is a need for a positive electrode active material in which contact with moisture may be effectively blocked, the dissolution of the transition metal may be suppressed, the collapse of the surface structure of the lithium transition metal oxide may be minimized, the change in the oxidation number of the metal in the lithium transition metal oxide may be minimized, and the electrical conductivity is high.

Technical Problem

An aspect of the present invention provides a positive electrode active material which may minimize collapse of a surface structure of a lithium transition metal oxide by improving electrical conductivity of the positive electrode active material and effectively blocking a contact between moisture and the lithium transition metal oxide in the positive electrode active material, and may minimize dissolution of a transition metal by minimizing a change in oxidation number of a metal in the lithium transition metal oxide.

Another aspect of the present invention provides a positive electrode including the positive electrode active material and a secondary battery including the positive electrode and having improved input/output characteristics and life characteristics.

TECHNICAL SOLUTION

According to an aspect of the present invention, there is provided a positive electrode active material including a core and a coating layer disposed on the core, wherein the core includes $Li_{1+x}M_yO_{2+z}$, wherein M is at least one element selected from the group consisting of nickel (Ni), cobalt (Co), manganese (Mn), iron (Fe), phosphorus (P), aluminum (Al), magnesium (Mg), calcium (Ca), zirconium (Zr), zinc (Zn), titanium (Ti), ruthenium (Ru), niobium (Nb), tungsten (W), boron (B), silicon (Si), sodium (Na), potassium (K), molybdenum (Mo), and vanadium (V), wherein $-0.2 \leq x \leq 0.2$, $0 < y \leq 2$, and $0 \leq z \leq 2$, wherein the coating layer includes a carbon-based particle, wherein the carbon-based particle includes a structure in which a plurality of graphene sheets are connected to each other, and wherein a D/G peak ratio of the positive electrode active material is in a range of 0.9 to 1.3 during Raman spectrum measurement.

According to another aspect of the present invention, there is provided a positive electrode including the positive electrode active material.

According to another aspect of the present invention, there is provided a secondary battery including the positive electrode.

Advantageous Effects

According to the present invention, since a contact between a core and external moisture is effectively blocked, structural collapse of the core may be prevented, and accordingly, input/output characteristics and life characteristics of a battery may be improved. Also, since a coating layer including carbon-based particles may be uniformly formed with a small thickness, electrical conductivity of a positive electrode active material may be significantly improved, and thus, the input/output characteristics of the battery may be improved. Furthermore, since there is no separate heat treatment process during the formation of the coating layer, an excessive change in oxidation number of transition metal in the core is prevented, and thus, a transition metal dissolution problem of the positive electrode active material may be suppressed and the input/output characteristics and life characteristics of the battery may be improved.

DETAILED DESCRIPTION

Figure 1:
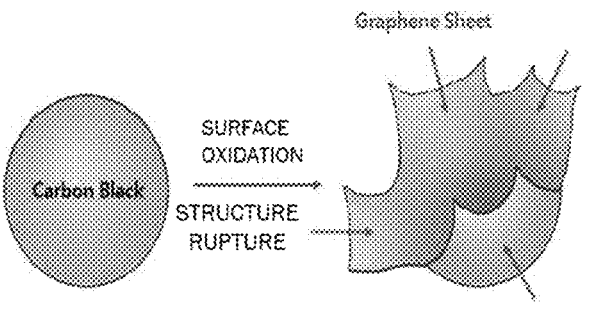
FIG. 1 is a schematic view illustrating a process of forming graphene sheets of a preliminary carbon-based particle of Preparation Example 1 and a transmission electron microscope (TEM) image.
Figure 1:
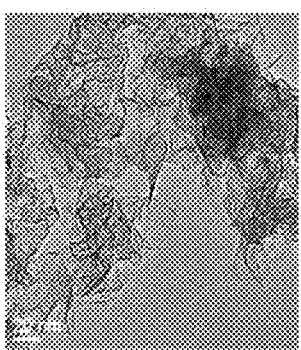

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The expression "average particle diameter ($D_{50}$)" in the present specification may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm and may obtain highly repeatable and high-resolution results.

<Positive Electrode Active Material>

A positive electrode active material according to an embodiment of the present invention includes a core and a coating layer disposed on the core, wherein the core includes $Li_{1+x}M_yO_{2+z}$, wherein M is at least one element selected from the group consisting of nickel (Ni), cobalt (Co), manganese (Mn), iron (Fe), phosphorus (P), aluminum (Al), magnesium (Mg), calcium (Ca), zirconium (Zr), zinc (Zn), titanium (Ti), ruthenium (Ru), niobium (Nb), tungsten (W), boron (B), silicon (Si), sodium (Na), potassium (K), molybdenum (Mo), and vanadium (V), wherein $-0.2 \leq x \leq 0.2$, $0 < y \leq 2$, and $0 \leq z \leq 2$, wherein the coating layer includes a carbon-based particle, wherein the carbon-based particle includes a structure in which a plurality of graphene sheets are connected to each other, and wherein a D/G peak ratio of the positive electrode active material is in a range of 0.9 to 1.3 during Raman spectrum measurement.

The core includes $Li_{1+x}M_yO_{2+z}$, wherein M may be at least one element selected from the group consisting of Ni, Co, Mn, Fe, P, Al, Mg, Ca, Zr, Zn, Ti, Ru, Nb, W, B, Si, Na, K, Mo, and V, and x, y, and z may satisfy $-0.2 \leq x \leq 0.2$, $0 < y \leq 2$, and $0 \leq z \leq 2$, respectively. x may preferably satisfy $-0.1 \leq x \leq 0.1$ and may more preferably satisfy $0 \leq x \leq 0.1$. Specifically, the $Li_{1+x}M_yO_{2+z}$ may include $Li_{1+x}[Ni_aCo_bM^1_cM^2_d]O_2$ or may be $Li_{1+x}[Ni_aCo_bM^1_cM^2_d]O_2$. In the $Li_{1+x}[Ni_aCo_bM^1_cM^2_d]O_2$, $M^1$ may be at least one element of Al and Mn, $M^2$ may be at least one element selected from the group consisting of Fe, P, Mg, Ca, Zr, Zn, Ti, Ru, Nb, W, B, Si, Na, K, Mo, and V, a may satisfy $0 < a < 1$, preferably $0.3 \leq a < 1$, and more preferably $0.5 \leq a < 1$, b may satisfy $0 < b < 1$, preferably $0 < b < 0.7$, and more preferably $0 < b < 0.5$, c may satisfy $0 < c < 1$, preferably $0 < c < 0.7$, and more preferably $0 < c < 0.5$, and d may satisfy $0 \leq d \leq 0.2$, preferably $0 \leq d \leq 0.1$. The $Li_{1+x}M_yO_{2+z}$ may include at least one selected from the group consisting of $LiCoC_2$, $LiNiO_2$, $LiMnO_2$, $Li[Ni_{0.5}Co_{0.3}Mn_{0.2}]O_2$, $Li[Ni_{0.6}Co_{0.2}Mn_{0.2}]O_2$, $Li[Ni_{0.7}Co_{0.1}Mn_{0.2}]O_2$, $Li[Ni_{0.8}Co_{0.1}Mn_{0.1}]O_2$, $Li[Ni_{0.9}Co_{0.05}Mn_{0.05}]O_2$, $LiMn_2O_4$, $LiFePO_4$, and $0.5Li_2MnO_3 \cdot 0.5Li[Mn_{0.4}Ni_{0.3}Co_{0.3}]O_2$. Preferably, the $Li_{1+x}M_yO_{2+z}$ may include any one of $Li[Ni_{0.6}Co_{0.2}Mn_{0.2}]O_2$, $Li[Ni_{0.7}Co_{0.1}Mn_{0.2}]O_2$, $Li[Ni_{0.8}Co_{0.1}Mn_{0.1}]O_2$, and $Li[Ni_{0.9}Co_{0.05}Mn_{0.05}]O_2$. Since the core includes $Li_{1+x}M_yO_{2+z}$, lithium may be sufficiently supplied to a negative electrode, and, since the $Li_{1+x}M_yO_{2+z}$ exhibits electrochemical activity after the first cycle without causing degradation of overall performance of a battery, a loss of battery capacity due to irreversible capacity of the negative electrode may be eliminated.

The $Li_{1+x}M_yO_{2+z}$ may be in the form of a secondary particle which is formed by bonding or assembling primary particles, or, alternatively, may be in the form of a single particle.

In a case in which the $Li_{1+x}M_yO_{2+z}$ is in the form of a secondary particle, energy density of a positive electrode may be improved, and, since a contact area between the $Li_{1+x}M_yO_{2+z}$ and an electrolyte solution is large and a movement distance of lithium ions in the $Li_{1+x}M_yO_{2+z}$ is short, capacity and output characteristics of the battery may be improved. Also, in a case in which the $Li_{1+x}M_yO_{2+z}$ is in the form of a secondary particle, a coating layer, which will be described later, may be uniformly formed on surfaces of the primary particles of the $Li_{1+x}M_yO_{2+z}$ and a surface of the secondary particle including concave spaces between the primary particles. In a case in which the $Li_{1+x}M_yO_{2+z}$ is in the form of a single particle, the coating layer to be described later may be formed on the surface of the $Li_{1+x}M_yO_{2+z}$ to have uniform thickness and shape.

The coating layer may be disposed on the core. Specifically, the coating layer may cover at least a portion of a surface of the core.

The coating layer may include one or more carbon-based particles.

The carbon-based particle may include a structure in which a plurality of graphene sheets are connected. In the present invention, the expression "graphene sheet" means a carbonaceous structure having a thickness of 20 nm or less, flexibility, and a thin film form. Specifically, in the carbon-based particle, at least two graphene sheets may be directly connected to each other or may be indirectly connected. Since the carbon-based particles include the structure in which the plurality of graphene sheets are connected, the surface of the core may be smoothly covered by the carbon-based particles. That is, since most of the surface of the core is covered by the carbon-based particles, a contact between the core and external moisture is effectively blocked, and thus, structural collapse of the core may be prevented. The carbon-based particles may include graphene sheets having different plane directions.

The carbon-based particle may be in the form of a secondary particle which is formed by connection of the plurality of graphene sheets. Specifically, the plurality of graphene sheets may be interconnected to form a secondary particle in the form of a long chain, and, more specifically, the secondary particle in the form of a chain may partially include an aggregated region of the plurality of graphene sheets. Since the secondary particle has a unique connection structure in the form of a chain, electrical conductivity and thermal conductivity of the carbon-based particle is excellent.

The carbon-based particle may further include a connection portion connected to at least a part of the plurality of graphene sheets. In the present invention, during the preparation of the carbon-based particle, a carbonaceous material, such as carbon black, is ruptured by continuous oxidation to form the graphene sheets and a portion retaining its original shape without being ruptured may also be present. In this case, the portion retaining its shape may correspond to the connection portion. Thus, the connection portion may have a non-graphene shape, and the expression "non-graphene shape", different from the above-described graphene sheet, may denote a lump shape having a thickness greater than the graphene sheet.

A portion of each graphene sheet of the plurality of graphene sheets may be directly connected to each other. Alternatively, at least a portion of the graphene sheets of the plurality of graphene sheets may be connected to each other through the connection portion, and, specifically, at least a portion of each graphene sheet of the plurality of graphene sheets may be connected to the connection portion. The carbon-based particle may include both of the two connection methods.

The carbon-based particles are formed while preliminary carbon-based particles are coated on the core. The preliminary carbon-based particle may be formed by modification of carbon black in the form of a near-spherical particle, for example, acetylene black, furnace black, thermal black, channel black, and lamp black, by an oxidation treatment. Referring to a schematic view of FIG. 1, a structure of carbon black may be modified by an oxidation treatment to form a preliminary carbon-based particle including a plurality of graphene sheets, and the preliminary carbon-based particle may be coated on the core to become a carbon-based particle. In a case in which the carbon black is in the form of a secondary particle, a carbon-based particle in the form of a secondary particle, in which particles including the plurality of graphene sheets are aggregated, may be formed.

The plurality of graphene sheets may have an average thickness of 10 nm or less, particularly 0.34 nm to 10 nm, and more particularly 0.34 nm to 5 nm. In a case in which the average thickness of the graphene sheets satisfies the above range, since flexibility that is unique to the graphene sheet may be expressed and a surface contact due to the graphene sheet is improved, electrical conductivity of the carbon-based particle may be excellent. The graphene sheet may have a shape in which 10 or less graphene layers are stacked. An average thickness of the graphene sheets may be identified through transmission electron microscope (TEM) analysis, and specifically, may be corresponded to an average value obtained by measuring thicknesses of 100 graphene sheets.

Each graphene sheet of the plurality of graphene sheets may have a lateral size of 10 nm to 500 nm, particularly 10 nm to 300 nm or less, and more particularly 10 nm to 100 nm, for example, 50 nm to 90 nm. The lateral size of the graphene sheet may be controlled depending on a degree of heat treatment, and, for example, the lateral size of the graphene sheet may be controlled by further performing a separate heat treatment in an inert atmosphere after the oxidation treatment. In a case in which the lateral size of the graphene sheet satisfies the above range, ions in the electrolyte solution may smoothly diffuse in the electrode. Thus, rapid charging characteristics of the battery may be improved and rate capability may also be improved. Also, since the graphene sheets may effectively cover the surface of the core, the contact between the core and the external moisture is effectively blocked, and thus, the structural collapse of the core may be prevented. Furthermore, side reactions caused by lithium on the surface of the core may be suppressed. Accordingly, input/output characteristics and life characteristics of the battery may be improved. The lateral size of the graphene sheet denotes an average of sizes of 100 graphene sheets observed by a scanning electron microscope (SEM) or TEM, and, herein, the expression "size" denotes the longest length when assuming a line from one point to another point in one graphene sheet.

The coating layer may have a thickness of 1 nm to 500 nm, particularly 10 nm to 300 nm, and more particularly 10 nm to 100 nm. In a case in which the thickness satisfies the above range, dissolution of the transition metal may be suppressed by minimizing a change in oxidation number of the transition metal in the $Li_{1+x}M_yO_{2+z}$ without inhibiting diffusion for intercalation and deintercalation of lithium ions. Accordingly, the input/output characteristics and the life characteristics of the battery may be improved.

A weight ratio of the core to the coating layer may be in a range of 99.9:0.1 to 90:10, particularly 99.9:0.1 to 95:5, and more particularly 99.9:0.1 to 99:1. In a case in which the weight ratio satisfies the above range, the dissolution of the transition metal may be suppressed by minimizing the change in the oxidation number of the transition metal in the $Li_{1+x}M_yO_{2+z}$ without inhibiting the diffusion for the intercalation and deintercalation of lithium ions. Accordingly, the input/output characteristics and life characteristics of the battery may be improved.

A D/G peak ratio may be in a range of 0.9 to 1.3, particularly 0.9 to 1.1, and more particularly 0.9 to 1.0 during Raman spectrum measurement of the positive electrode active material. In the Raman spectrum, a G peak near 1590 cm$^{-1}$ is due to Egg vibration mode of sp$^2$ bonds of carbon, and a D peak near 1350 cm$^{-1}$ appears when there is a defect in the sp$^2$ bonds of carbon. In a case in which the D/G peak ratio of the positive electrode active material is satisfied, carbon-based particles with a high degree of graphitization are coated on the surface of the core by a strong shear force. Accordingly, when the carbon-based particles are used, capacity and electrical characteristics of the battery may be improved due to the high electrical conductivity of the carbon-based particles.

The positive electrode active material may have a specific surface area of 2 m$^2$/g to 8 m$^2$/g, for example, 2 m$^2$/g to 5 m$^2$/g. In a case in which the specific surface area of the positive electrode active material is less than 2 m$^2$/g, the energy density of the positive electrode may be reduced. In a case in which the specific surface area of the positive electrode active material is greater than 8 m$^2$/g, a side reaction of the electrolyte solution may excessively occur. Thus, when the specific surface area of the positive electrode active material is in a range of 2 m$^2$/g to 8 m$^2$/g, the side reaction of the electrolyte solution may be suppressed while the energy density is maintained.

In a case in which a simple mixing method (e.g., an acoustic mixer, paint shaker, or blade mixer is used) is used during the formation of the coating layer, since a sufficient shear force to rearrange carbon in the coating layer may not be provided, the coating layer does not uniformly coat the core, and thus, the D/G peak ratio range and the specific surface area range of the positive electrode active material may not be derived. In the present invention, since it is possible to form a coating layer to such an extent that the rearrangement of the carbon structure proceeds by applying a strong shear force using a mechanofusion method, low levels of the D/G peak ratio (high degree of graphitization) range and the specific surface area range may be derived and the D/G peak ratio may be significantly changed before/after coating.

The positive electrode active material may have a powder electrical conductivity of 1.0×10$^{-3}$ s/cm to 1.0×10 s/cm, particularly 1.0×10$^{-3}$ s/cm to 1.0×10$^{-1}$ s/cm, and more particularly 1.0×10$^{-2}$ s/cm to 1.0×10$^{-1}$ s/cm. During the preparation of the positive electrode active material of the present invention, the carbon-based particles are disposed on the core through the mechanofusion method capable of applying a strong shear force. In this case, since the coating layer dense enough to rearrange the carbon structure in the carbon-based particles is formed, the above powder electrical conductivity may be derived. In a case in which the above range is satisfied, the dissolution of the transition metal may be suppressed by minimizing the change in the oxidation number of the transition metal in the $Li_{1+x}M_yO_{2+z}$ without inhibiting the diffusion for the intercalation and deintercalation of lithium ions. Accordingly, the input/output characteristics and life characteristics of the battery may be improved. The powder electrical conductivity may be measured by a 4 probe powder resistance measurement method.

<Positive Electrode>

A positive electrode according to another embodiment of the present invention may include the positive electrode active material of the above-described embodiment. Since a description of the positive electrode active material is the same as described above, it will be omitted.

The positive electrode may include a current collector and a positive electrode active material layer which is disposed on the current collector and includes the positive electrode active material. Furthermore, the positive electrode active material layer may further include a binder.

The current collector is not particularly limited so long as it has conductivity without causing adverse chemical changes in the battery. For example, copper, stainless steel, aluminum, nickel, titanium, fired carbon, aluminum or stainless steel that is surface-treated with one of carbon, nickel, titanium, silver, or the like may be used as the current collector. Specifically, a transition metal that absorbs carbon well, such as copper and nickel, may be used as the current collector. The positive electrode active material layer may be disposed on one surface or both surfaces of the current collector.

The binder may include at least one selected from the group consisting of a polyvinylidene fluoride-hexafluoro-propylene copolymer (PVDF-co-HFP), polyvinylidene fluoride, polyacrylonitrile, polymethylmethacrylate, polyvinyl alcohol, carboxymethyl cellulose (CMC), starch, hydroxy-propyl cellulose, regenerated cellulose, polyvinylpyrroli-done, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly acrylic acid, and a material having hydrogen thereof substituted with lithium (Li), sodium (Na), or calcium (Ca), or may include various copolymers thereof.

<Secondary Battery>

A secondary battery according to another embodiment of the present invention may include a negative electrode, a positive electrode, a separator disposed between the positive electrode and the negative electrode, and an electrolyte, wherein the positive electrode is the positive electrode of the above-described embodiment. Thus, a description of the positive electrode will be omitted.

The negative electrode may include a negative electrode current collector and a negative electrode active material layer which is disposed on one surface or both surfaces of the negative electrode current collector.

The negative electrode current collector is not particularly limited so long as it has conductivity without causing adverse chemical changes in the battery. For example, copper, stainless steel, aluminum, nickel, titanium, fired carbon, aluminum or stainless steel that is surface-treated with one of carbon, nickel, titanium, silver, or the like may be used as the negative electrode current collector. Specifically, a transition metal that absorbs carbon well, such as copper and nickel, may be used as the current collector.

The negative electrode active material layer may include a negative electrode active material, a negative electrode conductive agent, and a negative electrode binder.

The negative electrode active material may include graph-ite-based active material particles or silicon-based active material particles. At least one selected from the group consisting of artificial graphite, natural graphite, graphitized carbon fibers, and graphitized mesocarbon microbeads may be used as the graphite-based active material particles, and rate capability may be improved particularly when the artificial graphite is used. At least one selected from the group consisting of silicon (Si), $SiO_x$ ($0<x<2$), a Si—C composite, and a Si—Y alloy (where Y is an element selected from the group consisting of an alkali metal, an alkaline earth metal, a transition metal, a Group 13 element, a Group 14 element, a rare earth element, and a combination thereof) may be used as the silicon-based active material particles, and high capacity of the battery may be obtained particularly when Si and $SiO_x$ ($0<x<2$) are used.

The negative electrode binder may include at least one selected from the group consisting of a polyvinylidene fluoride-hexafluoropropylene copolymer (PVDF-co-HFP), polyvinylidene fluoride (PVdF), polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly acrylic acid, and a material having hydrogen thereof substituted with Li, Na, or Ca, or may include various copolymers thereof.

The negative electrode conductive agent is not particularly limited as long as it has conductivity without causing adverse chemical changes in the battery, and, conductive materials, for example, graphite such as natural graphite and artificial graphite; carbon black such as acetylene black, Ketjen black, channel black, furnace black, lamp black, and thermal black; conductive fibers such as carbon fibers or metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used as the separator. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be optionally used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

As the non-aqueous organic solvent, for example, an aprotic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate, may be used.

Particularly, among the carbonate-based organic solvents, since ethylene carbonate and propylene carbonate, as well as cyclic carbonate, effectively dissociate a lithium salt due to high permittivity as a highly viscous organic solvent, the cyclic carbonate may be preferably used. Since an electrolyte having high electrical conductivity may be prepared when the above cyclic carbonate is mixed with low viscosity, low permittivity linear carbonate, such as dimethyl carbonate and diethyl carbonate, in an appropriate ratio and used, the cyclic carbonate may be more preferably used.

A lithium salt may be used as the metal salt, and the lithium salt is a material that is readily soluble in the non-aqueous organic solvent, wherein, for example, at least one selected from the group consisting of $F^-$, $Cl^-$, $I^-$, $NO_3^-$, $N(CN)_2^-$. $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)^2N^-$, $CF_3CF_2(CF_3)_2CO^-$, $(CF_3SO_2)_2$ $CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

<Method of Preparing Positive Electrode Active Material>

A method of preparing a positive electrode active material according to another embodiment of the present invention includes the steps of: preparing preliminary carbon-based particles; and forming a coating layer by coating the preliminary carbon-based particles on a core, wherein the forming of the coating layer including carbon-based particles by coating the preliminary carbon-based particles on the core includes using a mechanofusion method after mixing the preliminary carbon-based particles and the core, the core includes $Li_{1+x}M_yO_{2+z}$, wherein M is at least one element selected from the group consisting of Ni, Co, Mn, Fe, P, Al, Mg, Ca, Zr, Zn, Ti, Ru, Nb, W, B, Si, Na, K, Mo, and V, $0 \leq x \leq 5$, $0 < y \leq 2$, and $0 \leq z \leq 2$, and the carbon-based particle may include a structure in which a plurality of graphene sheets are connected to each other. The positive electrode active material of the above-described embodiment may be formed by the above preparation method. A core, a coating layer, and carbon-based particles, which are finally included in the positive electrode active material, are the same as the core, the coating layer, and the carbon-based particles of the above-described embodiment.

The preparing of the preliminary carbon-based particles includes the steps of: preparing a carbonaceous material, and modifying the carbonaceous material by an oxidation treatment, wherein the modifying of the carbonaceous material by the oxidation treatment may include at least one of a) performing a first heat treatment of the carbonaceous material at a temperature of 200° C. to 800° C. in at least one atmosphere of an oxygen atmosphere and an air atmosphere; and b) reacting the carbonaceous material with an acidic vapor at 120° C. to 300° C.

The preparing of the preliminary carbon-based particles may include the steps of: preparing a carbonaceous material, and modifying the carbonaceous material by an oxidation treatment.

In the preparing of the carbonaceous material, the carbonaceous material may be carbon black. Specifically, the carbonaceous material may be at least one selected from the group consisting of acetylene black, furnace black, thermal black, channel black, and lamp black. More specifically, the carbonaceous material may be acetylene black which is produced at the highest temperature to basically have an excellent degree of graphitization.

The preparing of the carbonaceous material may include pyrolysis of acetylene gas, and carbon black, for example, acetylene black may be formed by the pyrolysis. The acetylene gas may be high purity acetylene gas, and may specifically be acetylene gas with a purity of 95% or more, for example, 98% or more.

The pyrolysis of the acetylene gas may be performed at a temperature of 1,500° C. or more, particularly 1,500° C. to 2,200° C., and more particularly 1,500° C. to 2,000° C. In a case in which the temperature satisfies the above range, a degree of graphitization of the prepared carbonaceous material may be high, and a degree of graphitization of the preliminary carbon-based particles thus prepared may also be high. Thus, electrical conductivity of the preliminary carbon-based particles may be improved.

The carbonaceous material may be carbon black, but, among them, acetylene black may be preferred in terms of the following aspect. The graphene sheets, which are included in the carbon-based particle included in the coating layer of the positive electrode active material of the present invention, may be formed by modification of a surface of the carbonaceous material by an oxidation treatment. A surface of the acetylene black formed by the pyrolysis may have a high degree of graphitization. Thus, a structure of a graphene sheet may be smoothly formed when the acetylene black is subjected to the oxidation treatment in comparison to a case where other carbon blacks inevitably including some oxygen functional groups on surfaces thereof are subject to the oxidation treatment.

The pyrolysis may be performed in such a manner that, after an internal temperature of a reaction furnace is adjusted to the above temperature range, acetylene gas is introduced into the reaction furnace and the pyrolysis is instantaneously performed. Also, in the process, air, oxygen, and $H_2O$ may be further added to control density of the preliminary carbon-based particles and an oxygen functional group, and a connection structure in the preliminary carbon-based particle may be controlled.

The modifying of the carbonaceous material by the oxidation treatment may include at least one of a) performing a first heat treatment of the carbonaceous material at a temperature of 200° C. to 800° C. in at least one atmosphere of an oxygen atmosphere or an air atmosphere (step a); and b) reacting the carbonaceous material with an acidic vapor at 120° C. to 300° C. (step b).

In step a, the at least one of the oxygen atmosphere and the air atmosphere may be formed by introducing oxygen and/or air into the reaction furnace containing the carbonaceous material. Specifically, the graphene sheet structure may be formed by an oxidation process in the reaction furnace according to the settings of appropriate flow amount and rate of oxygen or air, reaction temperature, and reaction time during the first heat treatment. Also, conditions of the oxidation process may vary depending on differences in density of the carbonaceous material and an amount of the oxygen functional group.

In step a, the first heat treatment may be performed by controlling a temperature of the reaction furnace in the reaction furnace containing the carbonaceous material. The first heat treatment may be performed at a heat treatment temperature of 200° C. to 800° C., and may specifically be performed at a heat treatment temperature of 200° C. to 450° C. In a case in which the heat treatment temperature satisfies the above range, excessively rapid oxidation of the carbonaceous material may be prevented, and a graphene sheet having a desired size may be formed. The first heat treatment may be performed for 1 hour to 50 hours.

In step b, the carbonaceous material may react with an acidic vapor to be oxidized to form graphene. Specifically, the acidic vapor may be a vapor derived from an acidic solution such as HCl and $HNO_3$. A temperature of the acidic vapor reacting with the carbonaceous material may be in a range of 120° C. to 300° C.

After the modifying of the carbonaceous material by the oxidation treatment, a second heat treatment process in an inert atmosphere may be further performed to increase the size of the graphene sheet formed. Specifically, the method of preparing a positive electrode active material may further include performing a second heat treatment of the carbonaceous material modified by the oxidation treatment at a temperature of 500° C. or more in an inert atmosphere, after the modifying of the carbonaceous material by the oxidation treatment and before the forming of the coating layer including carbon-based particles by coating the preliminary carbon-based particles on the core. In this case, the inert atmosphere may be formed by vacuum or any one gas selected from the group consisting of helium, argon, and nitrogen. The second heat treatment temperature may be 500° C. or more, for example, 600° C. to 1, 600° C.

A mechanism of forming the preliminary carbon-based particles described in the present invention by the step of preparing the preliminary carbon-based particles may be as follows. During the preparation of the preliminary carbon-based particles, an oxidation treatment is performed on spherical or chain-type carbon black, in which spherical primary particles have an average diameter of 50 nm or less and the primary particles share the structure, for example, acetylene black under specific conditions. In this case, penetration and oxidation reaction of an oxidizing agent, such as oxygen and acidic vapor, occur from a defect portion such as a grain boundary or a dislocation present in a unit microstructure of the carbon black. When the oxidation treatment is performed for a predetermined time in the temperature range described in the preparation method, the oxidizing agent penetrates into the internal microstructure of the carbon black to cause oxidation. In this case, in order to relieve structural stress of the microstructure of the primary particle which has a radius of curvature greater than a radius of curvature of a surface of the spherical primary particle, an oxidation reaction occurs rapidly in the primary particle. Accordingly, internal carbon atoms are oxidized to gases such as CO, $CO_2$, and $CH_4$, and the primary particles are converted to a hollow type. Most of the structural stresses remaining in the spherical primary particles are also relieved while a surface structure of the hollow-type primary particles is also destroyed by the continuous oxidation treatment, and graphene sheets appear in this process. Thus, the modification process may be accelerated as the average diameter of the carbon black, as the primary particle, is decreased, internal density of the particle is decreased, and an amount of the oxygen functional group in the primary particle is greater than that on the surface of the primary particle. Also, step a is more desirable than step b in terms of the fact that step a may further accelerate the modification process.

Similar to the carbon-based particle of the above-described embodiment, the preliminary carbon-based particle has a structure in which a plurality of graphene sheets are connected to each other, and has the same physical properties, such as the lateral size and the thickness, of the graphene sheets in the carbon-based particle of the above-described embodiment.

The preliminary carbon-based particle may have a specific surface area ($m^2/g$) measured by a nitrogen adsorption Brunauer-Emmett-Teller (BET) method of 200 $m^2/g$ or more, particularly 300 $m^2/g$ to 1,100 $m^2/g$, and more particularly 500 $m^2/g$ to 900 $m^2/g$. In a case in which the above specific surface area range is satisfied, it means that an area of the graphene sheets in the preliminary carbon-based particle is large, and, accordingly, the conductivity of the electrode may be ensured even if an amount of the conductive agent in the electrode is small. Also, since the contact between the core and the external moisture is effectively blocked, the structural collapse of the core may be prevented. Accordingly, initial charge capacity of the battery may be improved.

The preliminary carbon-based particle may have an oxygen content of 1 wt % or more, particularly 1 wt % to 10 wt %, and more particularly 1 wt % to 5 wt % in the preliminary carbon-based particle. In a case in which the oxygen content of the preliminary carbon-based particle satisfies the above range, since the preliminary carbon-based particles may be smoothly dispersed in a dispersion when forming the coating layer through a wet process, the coating layer may be formed more evenly. The oxygen content may be measured by carbon (C), hydrogen (H), oxygen (O), and nitrogen (N) elemental analysis.

The oxygen content may be achieved during the oxidation treatment of the carbon black. Specifically, an oxygen-containing functional group may be formed on a surface of the preliminary carbon-based particle by the oxidation treatment. The oxygen-containing functional group may be at least one selected from the group consisting of a carboxyl group, a hydroxy group, and a carbonyl group. After the oxidation treatment, the oxygen content may be further controlled by performing a heat treatment on the preliminary carbon-based particles in an inert atmosphere.

In this respect, the preliminary carbon-based particle is different from typical graphene. That is, with respect to the typical graphene, since it is prepared by grinding particles of artificial graphite or the like, the oxygen content may not be as high as 1 wt % or more, and the oxygen content is very low or only 0. Also, according to a method of preparing typical graphene formed through grinding, graphene is formed one by one (graphene sheet), but, according to the present invention, preliminary carbon-based particles including a structure, in which a plurality of graphene sheets are connected, are formed.

The preliminary carbon-based particle may have a higher degree of graphitization than the carbon black before the oxidation treatment. Specifically, since high structural stress caused by surface tension of the carbon black may be partially eliminated while the graphene sheets are formed, the degree of graphitization of the prepared preliminary carbon-based particle may be increased.

The preliminary carbon-based particle may have a value calculated by the following Equation 1 of 0.12 or less, particularly 0 to 0.1, and more particularly 0 to 0.07.

$$\frac{|b-a|}{a} \qquad \text{[Equation 1]}$$

In Equation 1, a is a specific surface area ($m^2/g$) of the preliminary carbon-based particle which is measured by a nitrogen adsorption BET method, and b is an iodine adsorption value (mg/g) of the preliminary carbon-based particle. In a case in which the preliminary carbon-based particle includes a pore structure in the inside thereof or between the particles, small-sized nitrogen ($N_2$) molecules may be adsorbed a lot in the pores. In contrast, since iodine ($I_2$), as a relatively larger molecule, is difficult to enter into the pores in comparison to the nitrogen, the iodine adsorption value is not large. That is, when the pore structure is present, the value according to Equation 1 is increased. In other words, in the preliminary carbon-based particle, that the value according to Equation 1 is 0.12 or less means that the preliminary carbon-based particle does not include micropores. That is, in a case in which there are no pores, since a degree of adsorption of iodine and a degree of adsorption of nitrogen are similar to each other, the value of Formula 1 is decreased. This means that the surface of the preliminary carbon-based particle is a free surface. Specifically, most of the carbon black is modified into a hollow structure by the oxidation treatment, and the structure is broken by the continuous oxidation treatment to form graphene sheets. In this case, the graphene sheets may be formed to open outward without forming the pore structure.

The step of forming the coating layer including carbon-based particles by coating the preliminary carbon-based particles on the core includes using a mechanofusion method after mixing the preliminary carbon-based particles and the core.

Specifically, the mechanofusion method may be performed using Nobilta equipment by Hosokawa Micron Corporation. After a mixture of the preliminary carbon-based particles and the core is put into a container, the container is rotated to move the mixture to an inner wall of the container by a centrifugal force. Thereafter, since a strong shear force is applied by an arm head approaching the inner wall of the container with a small gap, a coating layer including carbon-based particles is formed by strongly coating the preliminary carbon-based particles on the core by an interaction between surfaces of the particles of the mixture, and the preliminary carbon-based particles may be transformed into the above-described carbon-based particles.

The shear force may be in a range of 1 m/s to 500 m/s, for example, 10 m/s to 100 m/s.

In a case in which an acoustic mixer is used different from that of the present invention, since the acoustic mixer uses simple vibration, the preliminary carbon-based particles are relatively non-uniformly disposed on the surface of the core rather than the coating layer including carbon-based particles, and thus, it is different from the positive electrode active material of the present invention. In contrast, since the mechanofusion method corresponds to a method capable of applying a high mechanical shear force, the mechanofusion method is used during the preparation of the positive electrode active material to dramatically improve conductivity through uniform coating in the present invention.

Since the mechanofusion method applies the strong shear force by the arm head having a small gap, there is a limitation in that it is difficult to control a particle breakage phenomenon. However, after much effort, the researchers of the present invention confirmed the fact that the particle breakage phenomenon may be suppressed by using the preliminary carbon-based particles having a plurality of graphene sheets, and accordingly, a uniform coating layer may be formed through the mechanofusion method while the particle breakage phenomenon is suppressed.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Preparation Example 1: Preparation of Preliminary Carbon-Based Particles (1) Formation of Carbonaceous Material (Acetylene Black)

Acetylene black was formed by pyrolysis of acetylene gas having a purity of 98% by instantaneously injecting the acetylene gas into a reaction furnace with an internal temperature of 2,000° C.

(2) Preparation of Preliminary Carbon-Based Particles

Figure 2:
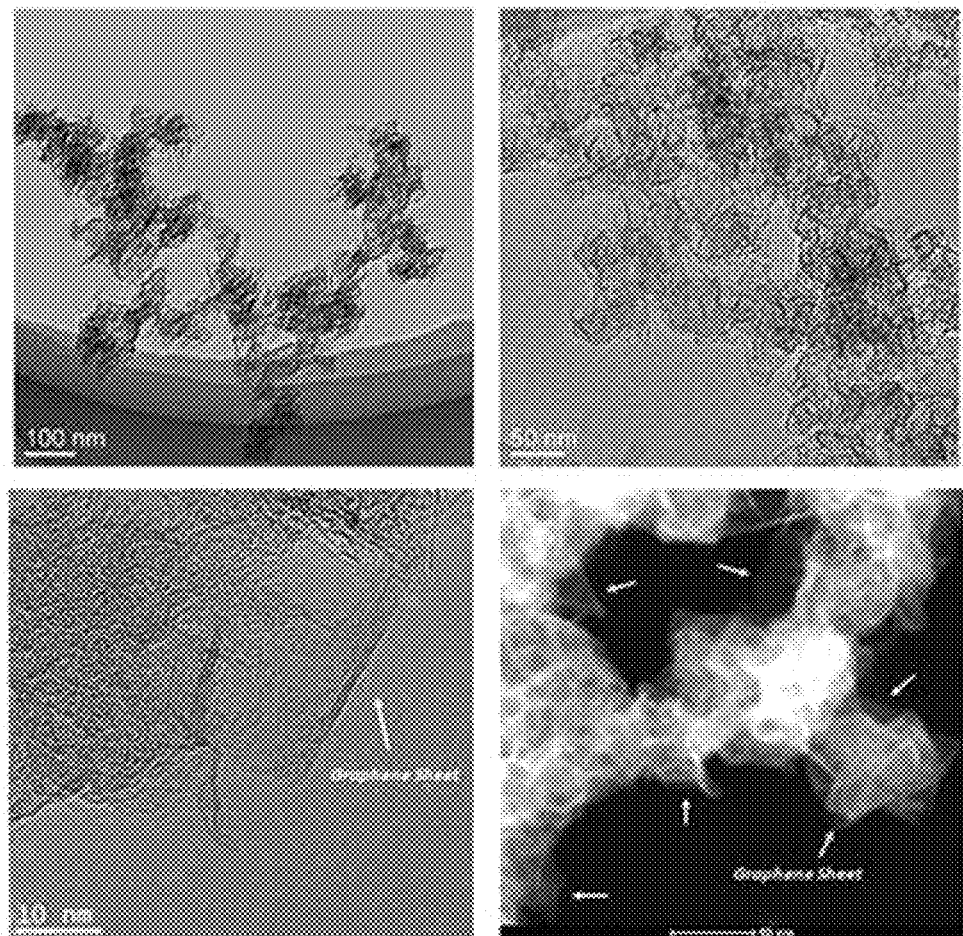
FIG. 2 is TEM and STEM (scanning TEM) images of the preliminary carbon-based particles of Preparation Example 1.
Figure 3:
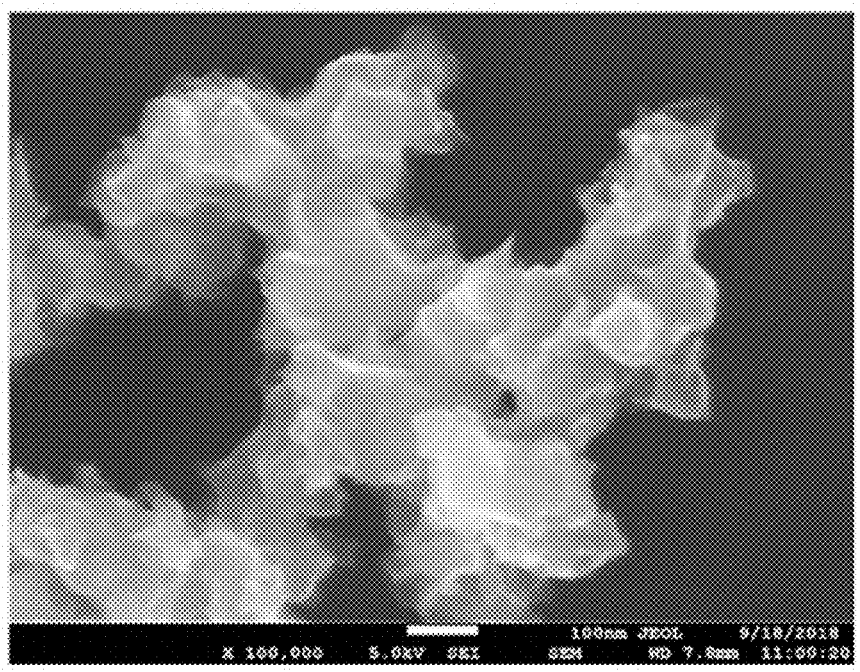
FIG. 3 is a scanning electron microscope (SEM) image of the preliminary carbon-based particles of Preparation Example 1.

Subsequently, the internal temperature of the reaction furnace containing the acetylene black was set to 250° C., and an oxidation treatment was then performed for 30 hours while introducing oxygen. As a result, preliminary carbon-based particles having a secondary particle structure, which included a shape in which a plurality of graphene sheets having a lateral size of about 41 nm were connected to each other, were obtained (see FIGS. 2 and 3).

A Raman spectrum D/G ratio of the preliminary carbon-based particles was 1.42. The Raman spectrum D/G ratio was measured by analyzing a Raman spectrum obtained using an Ar-ion laser with a wavelength of 514.5 nm by a Raman spectrometer (NRS-2000B, Jasco).

Preparation Example 2: Preparation of Preliminary Carbon-Based Particles

Figure 4:
FIG. 4 is (a) a TEM image of the preliminary carbon-based particles of Preparation Example 1 and (b) a TEM image of the preliminary carbon-based particles of Preparation Example 2.
Figure 4:
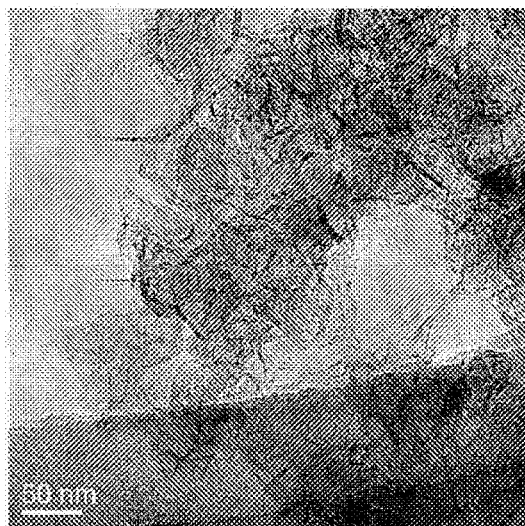

An additional heat treatment was performed on the preliminary carbon-based particles obtained in the preparation process of the preliminary carbon-based particles of Preparation Example 1 at 900° C. for 1 hour in an inert atmosphere to obtain preliminary carbon-based particles having a secondary particle structure which included a shape in which a plurality of graphene sheets, each having a lateral size of about 65 nm, were connected to each other. Referring to FIG. 4, it may be understood that the preliminary carbon-based particles of Preparation Example 1 (FIG. 4(a)) were transformed into the preliminary carbon-based particles of Preparation Example 2 (FIG. 4(b)) by the heat treatment.

A Raman spectrum D/G ratio of the preliminary carbon-based particles was 1.27.

Sample 1: Preparation of Carbon Black

Figure 5:
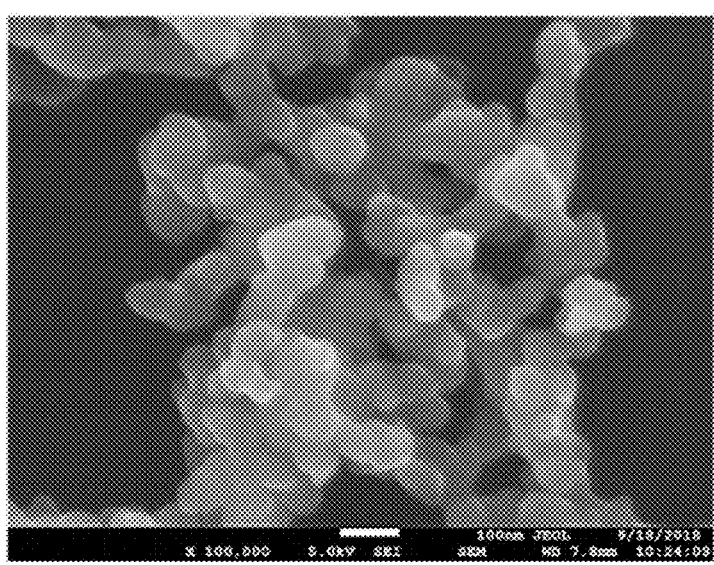
FIG. 5 is an SEM image of the carbon black of Sample 1.

Carbon black (acetylene black) in the form of a secondary particle, in which primary particles were aggregated, was prepared. An average particle diameter of the primary particle of the prepared carbon black was 12 nm. (Denka Company Limited, SAB (Small Acetylene Black)) (see FIG. 5)

A Raman spectrum D/G ratio of the carbon black was 1.68.

Sample 2: Preparation of Graphene

Graphene having an average thickness of 100 nm and an average diameter of 7 μm was prepared (Graphene Powder by KNANO Graphene Technology Corporation Limited). A Raman spectrum D/G ratio of the graphene was 0.22.

TABLE 1

| Preliminary carbon-based particles or carbon black | Nitrogen adsorption specific surface area (m²/g) | Iodine adsorption value (mg/g) | $\frac{|b-a|}{a}$ | Oxygen content (wt %) |
|---|---|---|---|---|
| Preparation Example 1 | 825 | 849 | 0.029 | 8.9 |
| Preparation Example 2 | 712 | 736 | 0.034 | 3.2 |
| Sample 1 | 376 | 456 | 0.213 | 4.7 |
| Sample 2 | 51 | 143 | 1.803 | 2.1 | a is a specific surface area (m²/g) of the carbon-based particle which is measured by a nitrogen adsorption BET method, and b is an iodine adsorption value (mg/g) of the carbon-based particle.

1) Nitrogen adsorption specific surface area (m²/g): it was measured by degassing at 200° C. for 8 hours and performing N₂ adsorption/desorption at 77K using a BET measurement instrument (BEL-SORP-MAX, Nippon Bell).

2) Iodine adsorption value (mg/g): it was measured according to ASTM D1510.

3) Oxygen content (wt %): amounts of C, H, and N elements were measured by an elemental analyzer (CHN-coder MT-5, Yanako), and the oxygen content (differential) was calculated to reflect an amount of residual ash.

Example 1: Preparation of Positive Electrode Active Material

Figure 6:
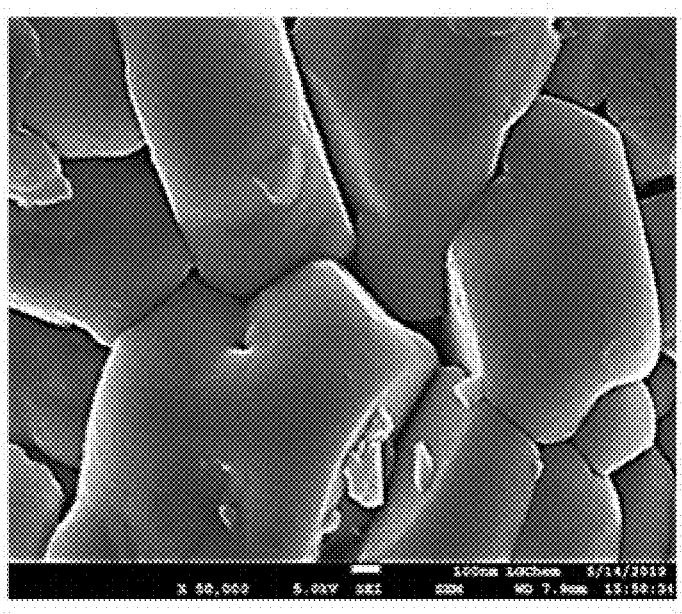
FIG. 6 is an SEM image of the $Li[Ni_{0.6}Co_{0.2}Mn_{0.2}]O_2$ used in Example 1.
Figure 7:
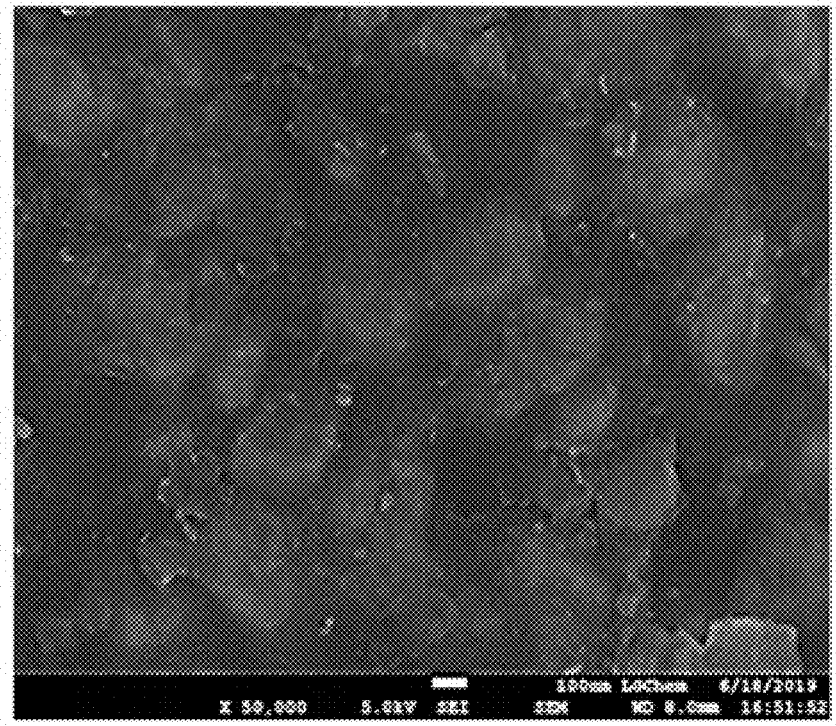
FIG. 7 is an SEM image of the positive electrode active material of Example 1 of the present invention.

After mixing $Li[Ni_{0.6}Co_{0.2}Mn_{0.2}]O_2$ (average particle diameter ($D_{50}$) of 9.0 μm, see FIG. 6) in the form of a secondary particle formed by bonding or assembling primary particles and the preliminary carbon-based particles of Preparation Example 1 in a weight ratio of 99:1, a coating layer including the carbon-based particles was formed on the $Li[Ni_{0.6}Co_{0.2}Mn_{0.2}]O_2$ in the form of a secondary particle using mechanofusion equipment (Nobilta NOB-130, Hosokawa Micron) at 3,000 rpm for 10 minutes to prepare a positive electrode active material (see FIG. 7).

Example 2: Preparation of Positive Electrode Active Material

A positive electrode active material was prepared by forming a coating layer in the same manner as in Example 1 except that the preliminary carbon-based particles of Preparation Example 2, instead of the preliminary carbon-based particles used in Example 1, were used.

Comparative Example 1: Preparation of Positive Electrode Active Material $Li[Ni_{0.6}Co_{0.2}Mn_{0.2}]O_2$ (average particle diameter ($D_{50}$) of 9.0 μm) in the form of a secondary particle formed by bonding or assembling primary particles and the preliminary carbon-based particles of Preparation Example 1 were mixed in a weight ratio of 99:1 and then mixed three times (total 6 minutes) using an acoustic mixer (Lab RAM-II, Resodyn) at 1,500 rpm for 2 minutes. Through this, the preliminary carbon-based particles were disposed on a surface of the $Li[Ni_{0.6}Co_{0.2}Mn_{0.2}]O_2$ to form a positive electrode active material (see FIG. 8).

Comparative Example 2: Preparation of Positive Electrode Active Material

Figure 9:
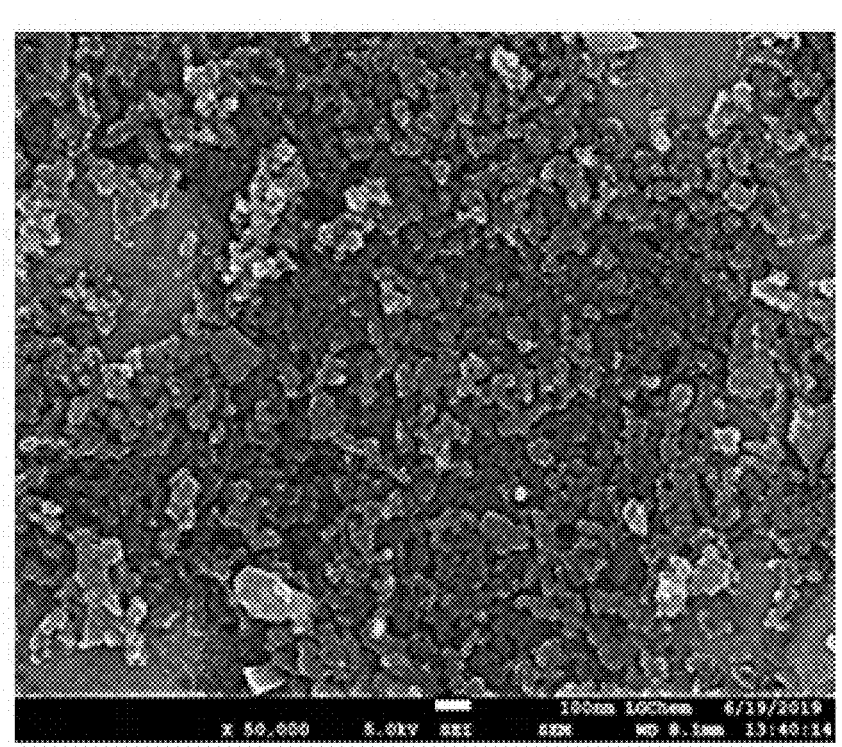
FIG. 9 is an SEM image of the positive electrode active material of Comparative Example 2 of the present invention.

A positive electrode active material was prepared by forming a coating layer in the same manner as in Example 1 except that the carbon black of Sample 1, instead of the preliminary carbon-based particles used in Example 1, was used (see FIG. 9).

Comparative Example 3: Preparation of Positive Electrode Active Material

A positive electrode active material was prepared by forming a coating layer in the same manner as in Comparative Example 1 except that the carbon black of Sample 1, instead of the preliminary carbon-based particles used in Comparative Example 1, was used.

Comparative Example 4: Preparation of Positive Electrode Active Material

A positive electrode active material was prepared by forming a coating layer in the same manner as in Comparative Example 1 except that the graphene of Sample 2, instead of the preliminary carbon-based particles used in Comparative Example 1, was used.

TABLE 2

| Lateral size of graphene sheet or average diameter of carbon black primary particle (nm) | Specific surface area of positive electrode active material (m²/g) | D/G peak ratio of positive electrode active material | Powder electrical conductivity of positive electrode active material (s/cm) |
|---|---|---|---|
| Example 1 | 41 (graphene sheet) | 5.68 | 1.03 | $2.01 \times 10^{-2}$ |
| Example 2 | 65 (graphene sheet) | 4.22 | 0.93 | $3.56 \times 10^{-2}$ |

TABLE 2-continued

| Lateral size of graphene sheet or average diameter of carbon black primary particle (nm) | Specific surface area of positive electrode active material (m²/g) | D/G peak ratio of positive electrode active material | Powder electrical conductivity of positive electrode active material (s/cm) |
|---|---|---|---|
| Comparative Example 1 | 41 (graphene sheet) | 8.59 | 1.39 | $6.83 \times 10^{-3}$ |
| Comparative Example 2 | 12 (carbon black primary particle) | 1.59 | 1.05 | $2.15 \times 10^{-3}$ |
| Comparative Example 3 | 12 (carbon black primary particle) | 1.84 | 1.08 | $4.62 \times 10^{-3}$ |
| Comparative Example 4 | 7000 (graphene) | 0.81 | 0.22 | $2.07 \times 10^{-3}$ |

After sizes of 100 graphene sheets in the coating layer were measured with a TEM (JEOL, JEM-2010F), the lateral size (nm) of the graphene sheet was confirmed by an average of the sizes. The specific surface area (m²/g) of the positive electrode active material was measured by a BET method, wherein, specifically, the specific surface area was calculated from a nitrogen gas adsorption amount at a liquid nitrogen temperature (77K) using BELSORP-mini II by Bell Japan Inc. The D/G peak ratio of the positive electrode active material was measured with an Ar-ion laser with a wavelength of 514.5 nm using a Raman spectrometer (NRS-2000B, Jasco).

After 5 g of the prepared positive electrode active material was put in a dedicated holder and then pressed by applying a force of 30 kN, the powder electrical conductivity (s/cm) of the positive electrode active material was measured using a 4 probe powder resistance measurement electrode for powder only (powder resistance system (MCP-PD51), Mitsubishi Chemical).

Experimental Example 1: SEM Image Evaluation

Figure 8:
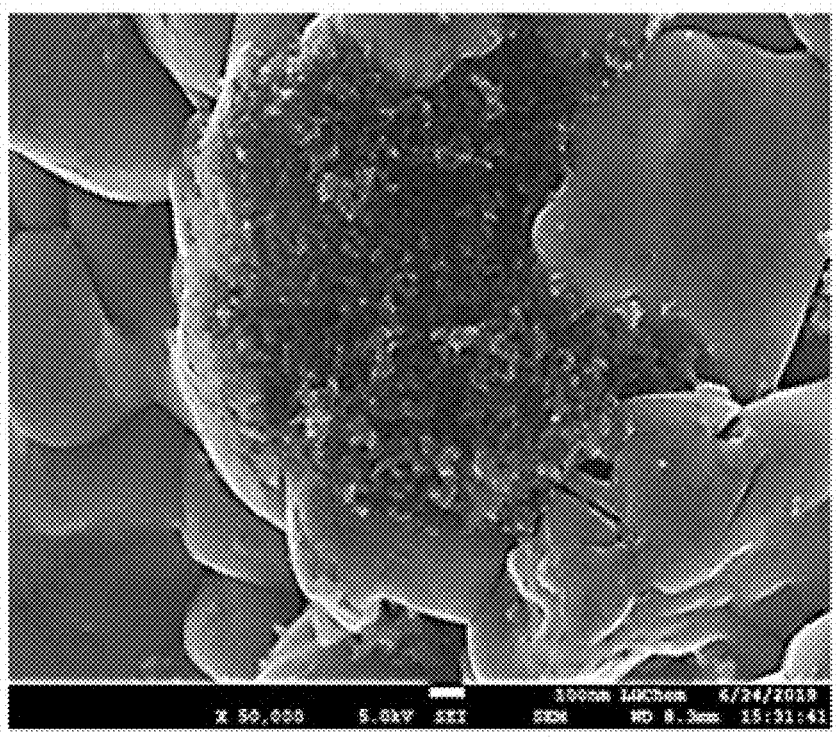
FIG. 8 is an SEM image of the positive electrode active material of Comparative Example 1 of the present invention.

FIGS. 7, 8, and 9 are SEM images of the positive electrode active materials of Example 1, Comparative Example 1, and Comparative Example 2, respectively.

Referring to FIG. 7, it may be understood that carbon-based particles were uniformly disposed over an entire surface of $Li[Ni_{0.6}Co_{0.2}Mn_{0.2}]O_2$ as well as an interface between the primary particles of $Li[Ni_{0.6}Co_{0.2}Mn_{0.2}]O_2$ to form a coating layer. Specifically, with respect to Example 1, since a graphene sheet shape of the carbon-based particles was completely collapsed, the positive electrode active material was observed in the form in which the carbon-based particles were smoothly coated on the surface while the graphene sheets were re-stacked and rearranged.

In contrast, referring to FIG. 8, the positive electrode active material of Comparative Example 1 was different from the positive electrode active material of Example 1 in that preliminary carbon-based particles were locally present only on a portion of a surface of $Li[Ni_{0.6}Co_{0.2}Mn_{0.2}]O_2$. Also, referring to FIG. 9, it may be understood that, in the positive electrode active material of Comparative Example 2, carbon black particles were agglomerated with each other without a change in carbon structure at an interface between the primary particles of $Li[Ni_{0.6}Co_{0.2}Mn_{0.2}]O_2$.

Experimental Example 2: Battery Performance Evaluation (Output/Discharge Characteristics Evaluation)

After batteries were prepared in the following manner, the prepared secondary batteries were constant current/constant voltage (CC/CV) charged at 0.1 C to 4.3 V, cut-off charged at 0.005 C, and constant current (CC) discharged at 0.1 C to 3.0 V to measure first charge capacity, and the results thereof are presented in Table 3 below.

Method of Preparing Battery:

(1) Preparation of Positive Electrode

Positive electrodes respectively including the positive electrode active materials of Examples 1 and 2 and Comparative Examples 1 to 4 were prepared. PVdF was used as a binder, and carbon black was used as a conductive agent.

The positive electrode active material, the binder, and the conductive agent were mixed so as to have a weight ratio of 97.5:1.5:1 in NMP, as a solvent, to prepare a positive electrode slurry. The positive electrode slurry was coated on a 20 μm thick positive electrode collector (Al), and dried at 130° C. to prepare the positive electrode.

(2) Battery Preparation

A negative electrode active material in which SiO and artificial graphite were mixed in a weight ratio of 1:9, carbon black as a negative electrode conductive agent, a styrene-butadiene rubber (SBR) as a negative electrode binder, and carboxymethyl cellulose (CMC) were mixed in distilled water at a weight ratio of 96.5:2:1:0.5 to prepare a negative electrode slurry. A 10 μm thick negative electrode collector (Cu) was coated with the prepared slurry and dried at 100° C. to prepare a negative electrode.

Thereafter, after a mono-cell was prepared by combining the above-prepared negative electrode and positive electrode with a 15 μm thick polyethylene-based separator disposed therebetween, an electrolyte solution (ethylene carbonate (EC)/ethylmethyl carbonate (EMC)=½ (volume ratio)), lithium hexafluorophosphate (1 M $LiPF_6$)) was injected into the mono-cell to prepare a lithium secondary battery.

The above-prepared battery was charged at a constant current of 0.2 C to 4.25 V at 25° C. and cut-off charged at 0.05 C. Subsequently, the battery was discharged at a constant current of 0.2 C to a voltage of 2.5 V to measure initial charge and discharge capacities.

Thereafter, the battery was charged at a constant current of 0.2 C to 4.25 V and cut-off charged at 0.05 C, and was discharged at a constant current of 2.0 C to a voltage of 2.5 V. The above charging and discharging were set as one cycle, and two cycles were performed. Thereafter, discharge capacity at 2.0 C relative to 0.2 C discharge capacity was measured for the battery, and the results thereof are presented in Table 3 below.

Experimental Example 3: Battery Performance Evaluation (Life Characteristics Evaluation)

Charge/discharge of each of the prepared batteries at 0.33 C/0.33 C in a voltage range of 4.25 V to 2.8 V at 45° C. were set as one cycle. After total 100 cycles were performed, discharge capacity after 100 cycles was evaluated based on discharge capacity after one cycle at 100%, and the results thereof are presented in Table 3 below.

TABLE 3

| | 2.0 C discharge capacity/ 0.2 C discharge capacity | Capacity retention (%) |
|---|---|---|
| Example 1 | 92.9 | 94.8 |
| Example 2 | 93.7 | 96.2 |
| Comparative Example 1 | 84.5 | 90.4 |
| Comparative Example 2 | 75.3 | 82.1 |

TABLE 3-continued

| | 2.0 C discharge capacity/ 0.2 C discharge capacity | Capacity retention (%) |
|---|---|---|
| Comparative Example 3 | 74.9 | 79.6 |
| Comparative Example 4 | 71.4 | 75.3 |

Referring to Table 3, it was confirmed that, when the positive electrode active materials of Examples 1 and 2 were used, output/discharge characteristics were better and life characteristics may be improved than a case where the positive electrode active materials of Comparative Examples 1 to 4 were used.

The invention claimed is:

1. A positive electrode active material, comprising:
a core;
a coating layer disposed on the core,
wherein the core comprises $Li_{1+x}M_yO_{2+z}$, wherein M is at least one element selected from the group consisting of nickel (Ni), cobalt (Co), manganese (Mn), iron (Fe), phosphorus (P), aluminum (Al), magnesium (Mg), calcium (Ca), zirconium (Zr), zinc (Zn), titanium (Ti), ruthenium (Ru), niobium (Nb), tungsten (W), boron (B), silicon (Si), sodium (Na), potassium (K), molybdenum (Mo), and vanadium (V), wherein $-0.2 \leq x \leq 0.2$, $0 < y \leq 2$, and $0 \leq z \leq 2$,
wherein the coating layer comprises carbon-based particles, and
wherein the carbon-based particles comprise a structure in which a plurality of graphene sheets are connected to each other; and
a connection portion connected to at least a part of the plurality of graphene sheets,
wherein the connection portion has a non-graphene shape, and
wherein a D/G peak ratio of the positive electrode active material is in a range of 0.9 to 1.3 during Raman spectrum measurement.

2. The positive electrode active material of claim 1, wherein the $Li_{1+x}M_yO_{2+z}$ comprises $Li_{1+x}[Ni_aCo_bM^1_cM^2_d]O_2$,
wherein $M^1$ is at least one element selected from the group consisting of Al and Mn,
wherein $M^2$ is at least one element selected from the group consisting of Fe, P, Mg, Ca, Zr, Zn, Ti, Ru, Nb, W, B, Si, Na, K, Mo, and V, and
wherein $0 < a < 1$, $0 < b < 1$, $0 < c < 1$, and $0 \leq d \leq 0.2$.

3. The positive electrode active material of claim 1, wherein each graphene sheet of the plurality of graphene sheets has a lateral size of 10 nm to 500 nm.

4. The positive electrode active material of claim 1, wherein at least a portion of each graphene sheet of the plurality of graphene sheets is connected to the connection portion.

5. The positive electrode active material of claim 1, wherein the plurality of graphene sheets has an average thickness of 0.34 nm to 10 nm.

6. The positive electrode active material of claim 1, wherein the coating layer has a thickness of 1 nm to 500 nm.

7. The positive electrode active material of claim 1, wherein a powder electrical conductivity of the positive electrode active material is in a range of $1.0 \times 10^{-3}$ s/cm to $1.0 \times 10$ s/cm.

8. The positive electrode active material of claim 1, wherein a weight ratio of the core to the coating layer is in a range of 99.9:0.1 to 90:10.

9. The positive electrode active material of claim 1, wherein a specific surface area of the positive electrode active material is in a range of 2 $m^2$/g to 8 $m^2$/g.

10. A positive electrode comprising the positive electrode active material of claim 1.

11. A secondary battery comprising the positive electrode of claim 10.

\* \* \* \* \*